(12) United States Patent
Lee et al.

(10) Patent No.: US 11,746,738 B2
(45) Date of Patent: Sep. 5, 2023

(54) WAVE POWER GENERATION APPARATUS

(71) Applicant: INGINE, INC., Seoul (KR)

(72) Inventors: Sang Heon Lee, Seoul (KR); Sang Wook Park, Seoul (KR)

(73) Assignee: INGINE, INC., Seoul (KR)

( * ) Notice: Subject to any disclaimer, the term of this patent is extended or adjusted under 35 U.S.C. 154(b) by 294 days.

(21) Appl. No.: 17/297,172

(22) PCT Filed: Nov. 26, 2019

(86) PCT No.: PCT/KR2019/016353
§ 371 (c)(1),
(2) Date: Jul. 30, 2021

(87) PCT Pub. No.: WO2020/111721
PCT Pub. Date: Jun. 4, 2020

(65) Prior Publication Data
US 2022/0025841 A1 Jan. 27, 2022

(30) Foreign Application Priority Data

Nov. 27, 2018 (KR) .................. 10-2018-0148421

(51) Int. Cl.
*F03B 13/18* (2006.01)
*F03B 15/00* (2006.01)

(52) U.S. Cl.
CPC .......... *F03B 13/1885* (2013.01); *F03B 15/00* (2013.01)

(58) Field of Classification Search
None
See application file for complete search history.

(56) References Cited

U.S. PATENT DOCUMENTS

| 4,516,033 A | * | 5/1985 | Olson | F03B 17/062 |
|---|---|---|---|---|
| | | | | 416/85 |
| 2008/0188150 A1 | * | 8/2008 | Hine | B63H 19/04 |
| | | | | 440/13 |

(Continued)

FOREIGN PATENT DOCUMENTS

| KR | 10-2010-0130665 A | 12/2010 |
|---|---|---|
| KR | 10-2013-0031634 A | 3/2013 |

(Continued)

OTHER PUBLICATIONS

Extended European Search Report for EP Application No. 19889932.0 dated Nov. 8, 2022.

(Continued)

*Primary Examiner* — Shafiq Mian
(74) *Attorney, Agent, or Firm* — Heslin Rothenberg Farley & Mesiti P.C.

(57) ABSTRACT

A wave power generation apparatus is disclosed. A wave power generation apparatus according to one embodiment can comprise: a floating body floating on the surface of the sea; a power transmission part, which is connected to the floating body so as to receive power generated according to the movement of the floating body, and moors the floating body on the surface of the sea; and a mooring angle adjustment module for adjusting the mooring angle of the floating body for the power transmission part according to the state of the waves acting on the floating body.

13 Claims, 6 Drawing Sheets

(56) References Cited

U.S. PATENT DOCUMENTS

| | | | | |
|---|---|---|---|---|
| 2015/0000263 A1* | 1/2015 | Foster | ............... | F03B 13/20 |
| | | | | 60/504 |
| 2017/0226984 A1* | 8/2017 | Gregory | ............. | F03B 13/18 |
| 2018/0187644 A1* | 7/2018 | Sung | .................. | F03B 13/18 |

FOREIGN PATENT DOCUMENTS

| | | |
|---|---|---|
| KR | 10-1379675 B1 | 3/2014 |
| KR | 10-2017-0000566 A | 1/2017 |
| WO | 2016/023874 A1 | 2/2016 |

OTHER PUBLICATIONS

International Search Report (and English translation) and Written Opinion of the International Searching Authority for International Application No. PCT/KR2019/016353 dated Mar. 5, 2020.

\* cited by examiner

WAVE POWER GENERATION APPARATUS

CROSS REFERENCE TO RELATED APPLICATIONS

This application is a national stage filing under section 371 of International Application No. PCT/KR2019/016353, filed on Nov. 26, 2019, and published as WO 2020/111721 A1, which claims priority to Korean Application No. 10-2018-0148421, filed on Nov. 27, 2018. The entire contents of WO 2020/111721 A1 are hereby incorporated herein by reference.

TECHNICAL FIELD

Example embodiments relate to a wave power generation apparatus.

BACKGROUND ART

A wave power generation apparatus may generate electric power using the energy of waves. The wave power generation apparatus may include a floating body that floats on the surface of sea waters to capture such wave energy. To increase power production efficiency, a structure that may effectively absorb the wave energy may be required. Thus, there is a desire for a floating body that may adjust a degree of submergence of the floating body from the surface of waters based on a state of waves and for a wave power generation apparatus including the floating body.

The above description has been possessed or acquired by the inventor(s) in the course of conceiving the present invention and is not necessarily an art publicly known before the present application is filed.

DISCLOSURE OF INVENTION

Technical Solutions

An aspect provides a wave power generation apparatus that may effectively absorb wave energy by adjusting a mooring angle of a floating body that is moored at a seabed.

Another aspect provides a wave power generation apparatus that may effectively absorb wave energy irrespective of the depth of waters.

According to an example embodiment, there is provided a wave power generation apparatus including a floating body configured to float on a surface of sea waters, a power transfer member connected to the floating body and configured to receive power generated from a movement of the floating body and moor the floating body on the surface of sea waters, and a mooring angle adjustment module configured to adjust a mooring angle of the floating body with respect to the power transfer member based on a state of waves that act on the floating body.

The mooring angle adjustment module may include a movable member connected to the floating body and configured to perform a translational motion in an outward direction of the floating body. The power transfer member may be fixed to a seabed below the floating body via the movable member.

The mooring angle adjustment module may allow the movable member to perform the translational motion such that a distance between the floating body and a passing portion of the power transfer member associated with the movable member changes.

The mooring angle adjustment module may further include a driver configured to allow the movable member to perform the translational motion, a sensor configured to sense the state of the waves that act on the floating body, and a controller configured to control an operation of the driver based on sensing information of the sensor.

The sensing information may include at least one of a travel direction of the waves that act on the floating body, a height of the waves, a period of the waves, and a pattern of the waves.

The driver may include a hydraulic cylinder.

When the floating body is observed from above, the movable member may be provided as a plurality of movable members in a radial form along a circumference of the floating body. The power transfer member may be provided as a plurality of power transfer members respectively passing through the movable members.

The mooring angle adjustment module may further include a guide member disposed at an end of the movable member and configured to guide a movement of the power transfer member.

A connecting portion of the power transfer member with respect to the floating body may be disposed above a connecting portion of the power transfer member with respect to the movable member.

The wave power generation apparatus may further include an intermediate floating body configured to float underwater below the floating body and connected to the power transfer member. The floating body may be moored on the surface of sea waters above the intermediate floating body through the power transfer member.

According to another example embodiment, there is provided a wave power generation apparatus including a floating body configured to float on a surface of sea waters, a power transfer member of which one side is connected to the floating body and another side is fixed to a seabed below the floating body to allow the floating body to be moored on the surface of sea waters, a mooring angle adjustment module connected to the floating body and configured to adjust a mooring angle of the floating body with respect to the power transfer member, and a generation portion connected to the power transfer member and configured to generate power through kinetic energy of the floating body.

The mooring angle adjustment module may include three movable members disposed separately from each other along a circumference of the floating body and configured to move toward an outer side of the floating body. The power transfer member may be provided as a plurality of power transfer members, and the power transfer members may be fixed to the seabed via the three movable members respectively.

The mooring angle adjustment module may further include a sensor configured to sense a state of waves that act on the floating body, and a controller configured to control a movement of each of the three movable members based on sensing information of the sensor.

The generation portion may include a drum around which the power transfer member is wound, a generator connected to the drum and configured to generate power through a rotation of the drum, and a tension force maintainer configured to maintain a tension force of the power transfer member by rotating the drum.

The wave power generation apparatus may further include an intermediate floating body disposed underwater below the floating body and to which another side of the power transfer member is fixed. The floating body may be moored on the surface of sea waters above the intermediate floating body.

Advantageous Effects

According to an example embodiment, a wave power generation apparatus may effectively absorb wave energy by adjusting a mooring angle of a floating body moored at a seabed.

According to another example embodiment, a wave power generation apparatus may effectively absorb wave energy irrespective of the depth of waters.

Advantageous effects of the wave power generation apparatus are not limited to the foregoing, and other effects that are not described above may also be understood by those having ordinary skill in the art from the following description.

BRIEF DESCRIPTION OF DRAWINGS

These and/or other aspects, features, and advantages of the present disclosure will become apparent and more readily appreciated from the following description of example embodiments, taken in conjunction with the accompanying drawings of which.

BEST MODE FOR CARRYING OUT THE INVENTION

Figure 1:
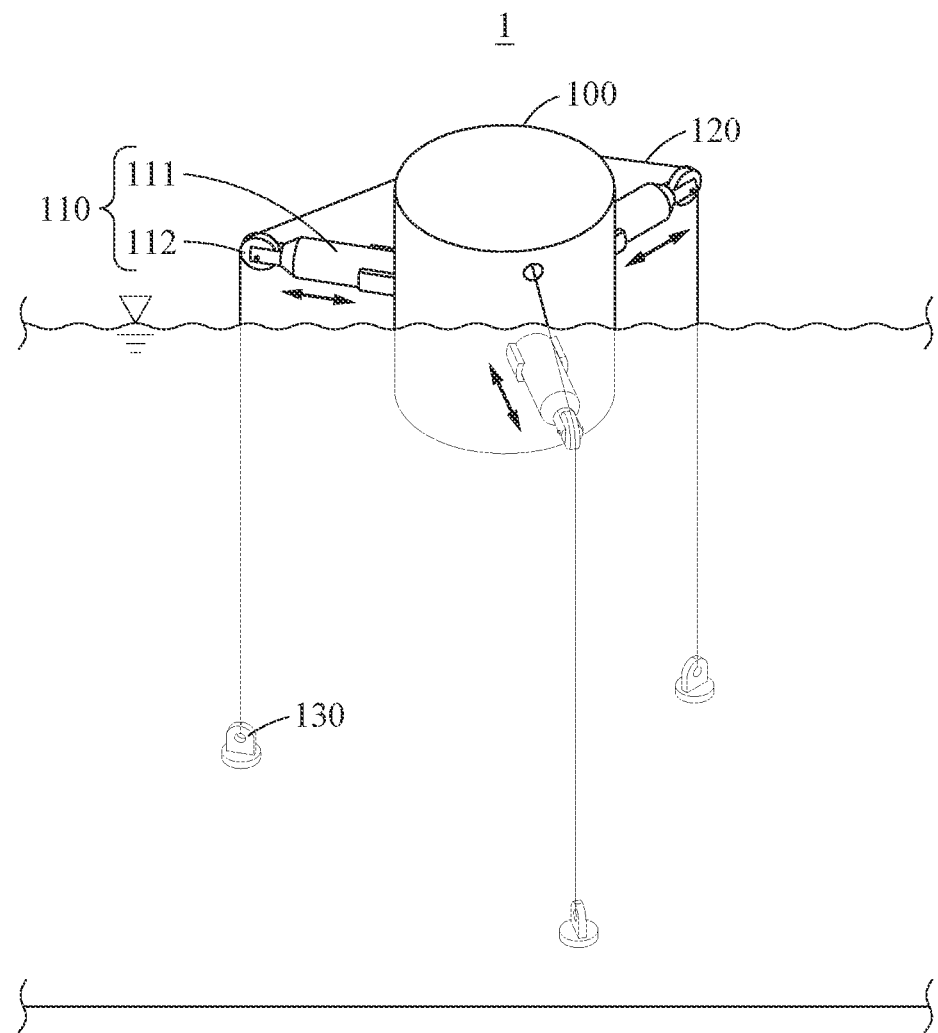
FIG. 1 is a perspective view of a wave power generation apparatus according to an example embodiment.

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples. Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween.

Also, in the description of example embodiments, detailed description of structures or functions that are thereby known after an understanding of the disclosure of the present application will be omitted when it is deemed that such description will cause ambiguous interpretation of the example embodiments. Hereinafter, example embodiments will be described in detail with reference to the accompanying drawings, and like reference numerals in the drawings refer to like elements throughout.

Figure 2:
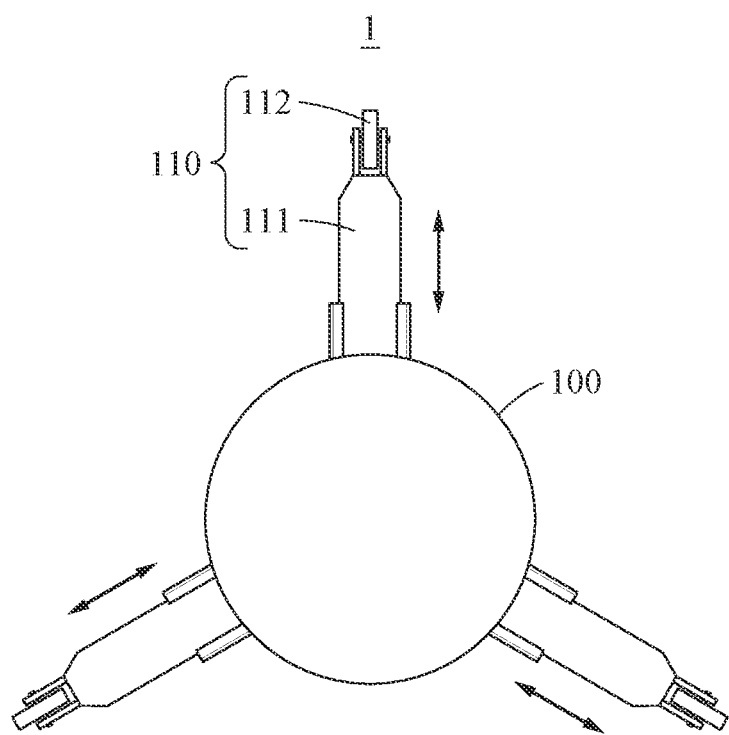
FIG. 2 is a planar view of a wave power generation apparatus according to an example embodiment.
Figure 3:
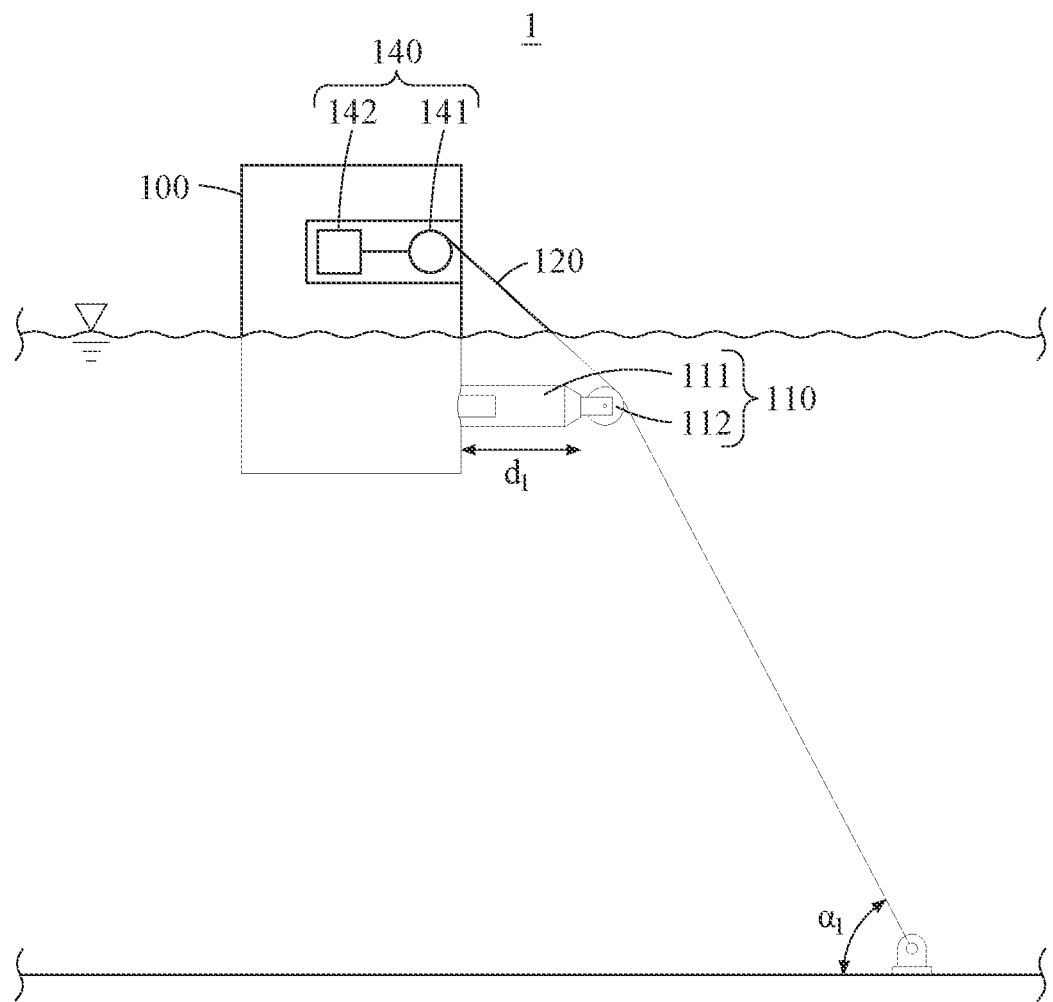
FIG. 3 is a diagram illustrating an example of an operation of a wave power generation apparatus according to an example embodiment.
Figure 4:
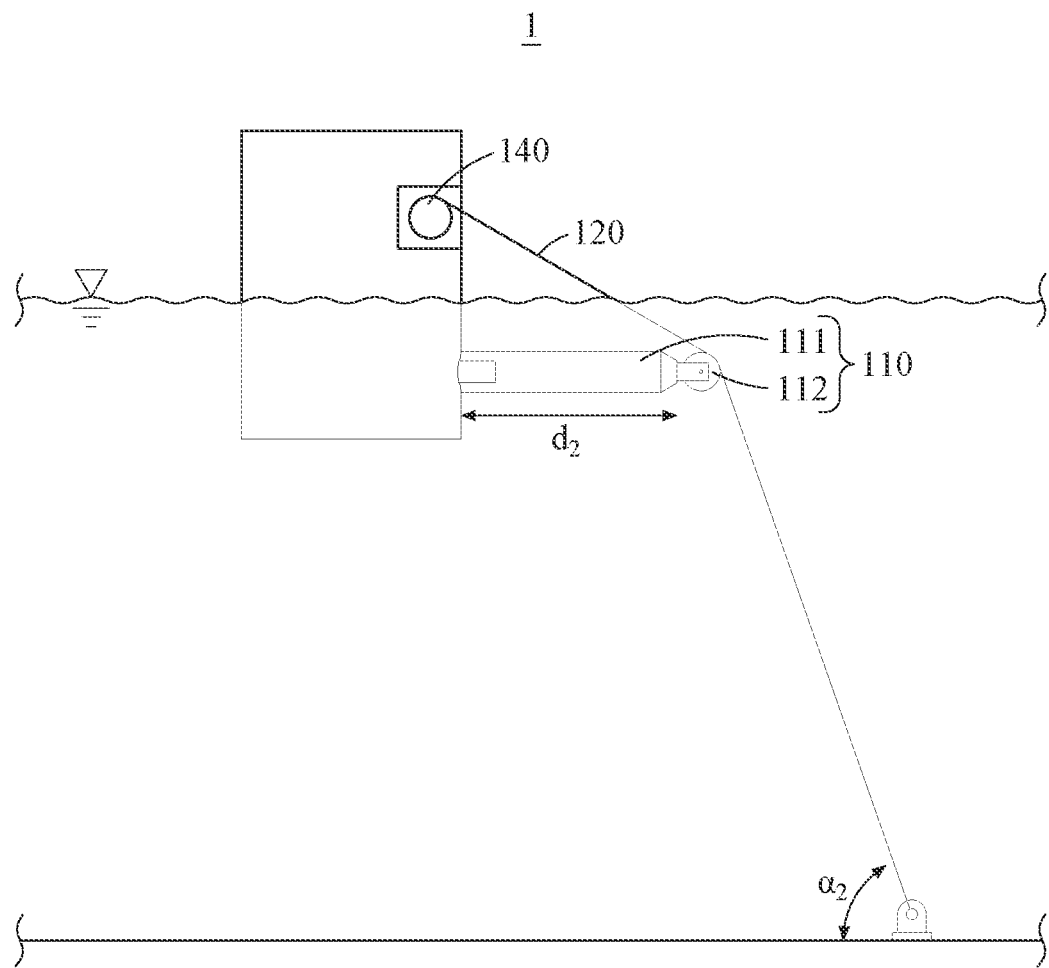
FIG. 4 is a diagram illustrating another example of an operation of a wave power generation apparatus according to an example embodiment.
Figure 5:
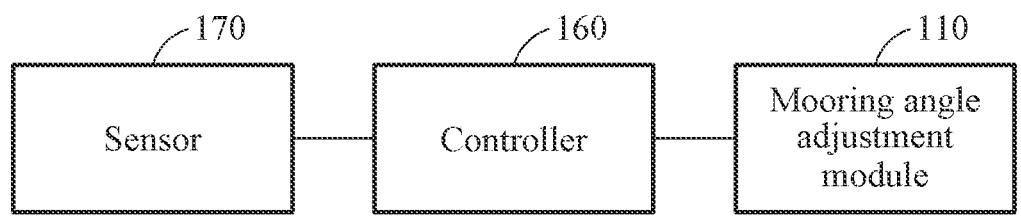
FIG. 5 is a block diagram illustrating a wave power generation apparatus according to an example embodiment.

FIG. 1 is a perspective view of a wave power generation apparatus according to an example embodiment. FIG. 2 is a planar view of a wave power generation apparatus according to an example embodiment. FIG. 3 is a diagram illustrating an example of an operation of a wave power generation apparatus according to an example embodiment. FIG. 4 is a diagram illustrating another example of an operation of a wave power generation apparatus according to an example embodiment. FIG. 5 is a block diagram illustrating a wave power generation apparatus according to an example embodiment.

Referring to FIGS. 1 through 5, a wave power generation apparatus 1 may generate electric power through wave energy. The wave power generation apparatus 1 may generate the power by absorbing kinetic energy of waves and converting the absorbed energy to mechanical kinetic energy. The wave power generation apparatus 1 may include a floating body 100, a power transfer member 120, a generation portion 140, and a mooring angle adjustment module 110.

The floating body 100 may float on the surface of sea waters. The floating body 100 may absorb wave energy while moving on the surface of sea waters by waves. The floating body 100 may translate or rotate on the surface of sea waters by a movement of waves. For example, the floating body 100 may perform a three degrees of freedom (3DoF) translational motion (heave, surge, sway) along X, Y, and Z axes, or a 3DoF rotational motion (yaw, pitch, roll) on the X, Y, and Z axes. That is, the floating body 100 may perform a 6DoF motion on the surface of sea waters. A degree of submergence of the floating body 100, which is a degree of the floating body 100 being submerged from the surface of sea waters, may be adjusted based on a state of waves.

The power transfer member 120 may moor the floating body 100 on the surface of sea waters. For example, one side of the power transfer member 120 may be connected to the floating body 100 and the other side thereof may be fixed to a seabed below the floating body 100 to allow the floating body 100 to be fixed at a certain location on the sea. For example, the one side of the power transfer member 120 may be wound around a drum 141 provided in the floating body 100 and the other side thereof may be connected to a fixing roller 130 that is installed on the seabed, and thus the length may be adjusted by a movement of the floating body 100. The power transfer member 120 may receive power generated from a movement of the floating body 100 and convert the received power to linear kinetic energy, and transfer the energy to the generation portion 140 to be described hereinafter.

The power transfer member 120 may be provided as a plurality of power transfer members 120, and the power transfer members 120 may be connected to the floating body 100. For example, the power transfer members 120 may be respectively connected to three or more different locations on the floating body 100. Through such a structure, the power transfer members 120 may be interlocked with a 6DoF movement of the floating body 100 and generate the linear kinetic energy. Hereinafter, a case where three power transfer members 120 are connected to the floating body 100 will be described as an example for the convenience of description.

The generation portion 140 may be connected to the power transfer member 120 and generate electric power through kinetic energy that is generated from a movement of the floating body 100. The generation portion 140 may include the drum 141, a generator 142, and a tension force maintainer (not shown).

Around the drum 141, the power transfer member 120 may be wound. The drum 141 may be provided in the floating body 100, and rotate based on a linear movement of the power transfer member 120. For example, the power transfer member 120 may be released from the drum 141 by a movement of the floating body 100 to increase the length thereof, and the drum 141 may rotate along the linear movement of the power transfer member 120 to convert the linear kinetic energy of the power transfer member 120 to rotational kinetic energy.

The generator 142 may be connected to the drum 141 and generate power through a rotation of the drum 141. The generator 142 may be provided inside the floating body 100.

The tension force maintainer may rotate the drum 141 to maintain a tension force of the power transfer member 120. For example, the tension force maintainer may rotate the drum 141 in a direction in which the power transfer member 120 is wound around the drum 141 to maintain the tension force of the power transfer member 120 to be sufficient to receive energy of a fluid.

The mooring angle adjustment module 110 may adjust a mooring angle of the floating body 100 with respect to the power transfer member 120 based on a state of waves that act on the floating body 100. For example, the mooring angle adjustment module 110 may adjust the mooring angle that is formed by the floating body 100 with each of the power transfer members 120 such that the floating body 100 absorbs wave energy effectively. The mooring angle adjustment module 110 may include a movable member 111, a guide member 112, a driver, a sensor 170, and a controller 160.

The movable member 111 may be connected to the floating body 100 and perform a translational motion in an outward direction of the floating body 100. To the other end of the movable member 111, the power transfer member 120 may be connected. A connecting portion of the power transfer member 120 with respect to the movable member 111 may be disposed below a connecting portion of the power transfer member 120 with respect to the floating body 100. That is, the power transfer member 120 may be fixed to the seabed below the floating body 100 via the movable member 111. The mooring angle adjustment module 110 may allow the movable member 111 to perform a translational motion to adjust a distance between the floating body 100 and a passing portion of the power transfer member 120 associated with the movable member 111. Thus, as the movable member 111 translates in the outward direction of the floating body 100, a mooring angle of the power transfer member 120 with respect to the floating body 120 may be adjusted.

The movable member 111 may be provided as a plurality of movable members 111. The movable members 111 may be connected in a radial form along a circumference of the floating body 100 when observed from above the floating body 100. In such a case, the movable members 111 may be respectively connected to the plurality of power transfer members 120. For example, as illustrated in FIG. 2, onto the circumference of the floating body 100, three movable members 111 may be connected, and three power transfer members 120 may be connected thereto respectively.

The guide member 112 may be provided at an end of the movable member 111 through which the power transfer member 120 passes and may guide a movement of the power transfer member 120. The guide member 112 may be, for example, a roller around which the power transfer member 120 is wound. The roller may guide a movement of the power transfer member 120 while rotating on an axis, and concurrently set a path such that the power transfer member 120 passes through the end of the movable member 111.

The driver may allow the movable member 111 to perform a translational motion. The driver may include a hydraulic cylinder that receives power and operates therewith. However, the hydraulic cylinder is provided merely as an example, and thus a type of the driver is not limited thereto.

The sensor 170 may sense a state of waves that act on the floating body 100. For example, the sensor 170 may obtain sensing information including at least one of a travel direction, a height, a period, and a pattern of the waves that act on the floating body 100.

The controller 160 may control an operation of the driver based on the sensing information of the sensor 170. The controller 160 may adjust a mooring angle of the floating body 100 with respect to the power transfer member 120 based on the sensing information of the sensor 170 such that the floating body 100 absorbs wave energy effectively.

The floating body 100 may float based on a movement of waves while being moored at a certain location on the surface of sea waters by the power transfer member 120. In such a case, the mooring angle formed between the floating body 100 and the power transfer member 120 may change based on a point on the seabed at which the power transfer member 120 is fixed and a location of the floating body 100. For example, when the floating body 100 is disposed at a location on a plane adjacent to the fixed point on the seabed, the mooring angle between the floating body 100 and the power transfer member 120 may be an angle that is close to a vertical angle, for example, 90 degrees (°). In such a case, energy generated by a movement of the floating body 100 may not be fully converted to linear energy of the power transfer member 120.

The mooring angle adjustment module 110 may adjust an angle formed between the floating body 100 and the point on the seabed at which the power transfer member 120 is fixed, and thus assist the wave power generation apparatus 1 in effectively absorbing the energy generated by a movement of the floating body 100. For example, as illustrated in FIG. 3, when the movable member 111 moves in an outward direction of the floating body 100 by a length d1, the floating body 100 may have a mooring angle of $\alpha 1$ with respect to the fixed point on the seabed. In addition, as illustrated in FIG. 4, when the movable member 111 moves further in an outward direction of the floating body 100 by a length d2, the floating body 100 may have an increased mooring angle of $\alpha 2$ with respect to the fixed point on the seabed.

When the plurality of power transfer members 120 is connected to the floating body 100, the plurality of movable members 111 through which the power transfer members 120 pass respectively may individually translate in an outward direction of the floating body 100, and thus a mooring angle of the floating body 100 formed with respect to the seabed may be adjusted such that the power transfer members 120 effectively absorb a 6DoF movement of the floating body 100.

Thus, the wave power generation apparatus 1 may adjust a mooring angle between the floating body 100 and each of the power transfer members 120 to most effectively absorb wave power based on a state of waves that act on the floating body 100.

Figure 6:
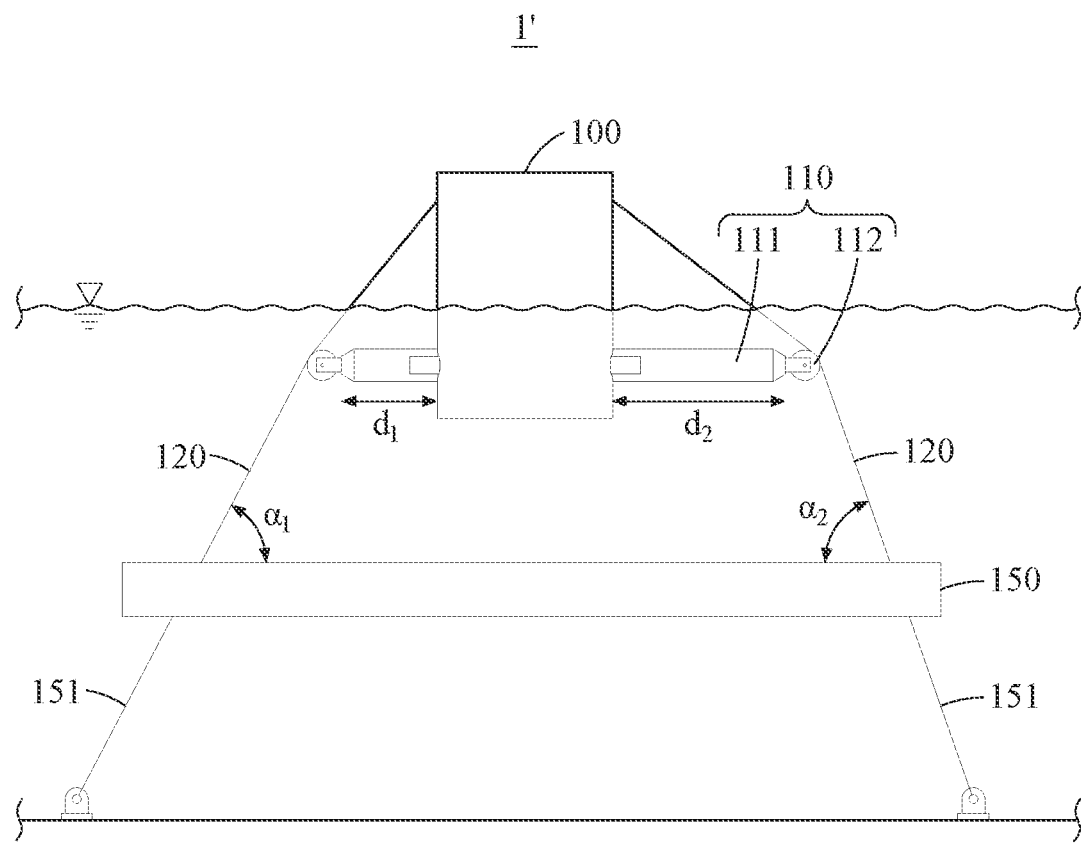
FIG. 6 is a schematic diagram illustrating a wave power generation apparatus according to an example embodiment.

FIG. 6 is a schematic diagram illustrating a wave power generation apparatus 1' according to an example embodiment.

Referring to FIG. 6, a wave power generation apparatus 1' may include a floating body 100, a power transfer member 120, a mooring angle adjustment module 110, and an intermediate floating body 150.

The intermediate floating body 150 may be disposed underwater below the floating body 100. The intermediate floating body 150 may be fixed while being moored at the seabed through a fixing member 151. In such a case, the floating body 100 may be connected to the intermediate floating body 150 through the power transfer member 120. For example, one side of the power transfer member 120 may be connected to the floating body 100, and another side thereof may be fixed to the intermediate floating member 150. That is, the floating body 100 may be moored on the surface of sea waters above the intermediate floating body 150.

The mooring angle adjustment module 110 may adjust a mooring angle of the floating body 100 with respect to a location at which the power transfer member 120 is fixed to the intermediate floating member 150. The mooring angle adjustment module 110 may adjust a relative location of the floating body 100 with respect to the intermediate floating body 150 by adjusting a distance between the floating body 100 and a plurality of power transfer members 120 connected to the floating body 100 as illustrated in FIG. 6.

Through such a structure as described above, it is possible to indirectly fix the power transfer member 120 used for mooring the floating body 100 to the seabed through the intermediate floating body 150, not by directly fixing the power transfer member 120 to the seabed, and thus the wave power generation apparatus 1' may be installed on the sea with a great depth of water. In addition, it is possible to reduce a length of the power transfer member 120 used for mooring the floating body 100, and thus readily adjust a mooring angle of the floating body 100 accordingly.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A wave power generation apparatus, comprising:
    a floating body configured to float on a surface of sea waters;
    a power transfer member connected to the floating body and configured to receive power generated from a movement of the floating body and moor the floating body on the surface of sea waters; and
    a mooring angle adjustment module configured to adjust a mooring angle of the floating body with respect to the power transfer member based on a state of waves that act on the floating body, and
    wherein the mooring angle adjustment module comprises:
    a movable member connected to the floating body and configured to perform a
    translational motion in an outward direction of the floating body, wherein the power transfer member is fixed to a seabed below the floating body via the movable member.

2. The wave power generation apparatus of claim 1, wherein the mooring angle adjustment module is configured to allow the movable member to perform the translational motion such that a distance between the floating body and a passing portion of the power transfer member associated with the movable member changes.

3. The wave power generation apparatus of claim 1, wherein the mooring angle adjustment module further comprises:
    a driver configured to allow the movable member to perform the translational motion;
    a sensor configured to sense the state of the waves that act on the floating body; and
    a controller configured to control an operation of the driver based on sensing information of the sensor.

4. The wave power generation apparatus of claim 3, wherein the sensing information comprises at least one of a travel direction of the waves that act on the floating body, a height of the waves, a period of the waves, and a pattern of the waves.

5. The wave power generation apparatus of claim 3, wherein the driver comprises a hydraulic cylinder.

6. The wave power generation apparatus of claim 2, wherein, when the floating body is observed from above, the movable member is provided as a plurality of movable members in a radial form along a circumference of the floating body, and
    the power transfer member is provided as a plurality of power transfer members respectively passing through the movable members.

7. The wave power generation apparatus of claim 1, wherein the mooring angle adjustment module further comprises a guide member disposed at an end of the movable member and configured to guide a movement of the power transfer member.

8. The wave power generation apparatus of claim 1, wherein a connecting portion of the power transfer member with respect to the floating body is disposed above a connecting portion of the power transfer member with respect to the movable member.

9. The wave power generation apparatus of claim 1, further comprising:
    an intermediate floating body configured to float underwater below the floating body and connected to the power transfer member,
    wherein the floating body is configured to be moored on the surface of sea waters above the intermediate floating body through the power transfer member.

10. A wave power generation apparatus, comprising:
    a floating body configured to float on a surface of sea waters;
    a power transfer member of which one side is connected to the floating body and another side is fixed to a seabed below the floating body to allow the floating body to be moored on the surface of sea waters;

a mooring angle adjustment module connected to the floating body and configured to adjust a mooring angle of the floating body with respect to the power transfer member; and a generation portion connected to the power transfer member and configured to generate power through kinetic energy of the floating body, and wherein the mooring angle adjustment module comprises three movable members disposed separately from each other along a circumference of the floating body and configured to move toward an outer side of the floating body, wherein the power transfer member is provided as a plurality of power transfer members, and the power transfer members are fixed to the seabed via the three movable members respectively.

11. The wave power generation apparatus of claim 10, wherein the mooring angle adjustment module further comprises:

a sensor configured to sense a state of waves that act on the floating body; and a controller configured to control a movement of each of the three movable members based on sensing information of the sensor.

12. The wave power generation apparatus of claim 10, wherein the generation portion comprises:

a drum around which the power transfer member is wound;

a generator connected to the drum and configured to generate power through a rotation of the drum; and a tension force maintainer configured to maintain a tension force of the power transfer member by rotating the drum.

13. The wave power generation apparatus of claim 10, further comprising:

an intermediate floating body disposed underwater below the floating body and to which another side of the power transfer member is fixed, wherein the floating body is configured to be moored on the surface of sea waters above the intermediate floating body.

* * * * *